United States Patent
Nielsen et al.

(10) Patent No.: US 12,539,514 B2
(45) Date of Patent: Feb. 3, 2026

(54) DETECTING PASSAGE OF A PARTICLE INTO A TARGET LOCATION

(71) Applicant: Hewlett-Packard Development Company, L.P., Spring, TX (US)

(72) Inventors: Jeffrey A. Nielsen, Corvallis, OR (US); Viktor Shkolnikov, Palo Alto, CA (US); Erica Midttveit, Corvallis, OR (US); Roberto A. Pugliese, Corvallis, OR (US); Matthew D. Smith, Corvallis, OR (US); Michael J. Day, Corvallis, OR (US); Diane R. Hammerstad, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 344 days.

(21) Appl. No.: 18/010,794

(22) PCT Filed: Jun. 17, 2020

(86) PCT No.: PCT/US2020/038156
§ 371 (c)(1),
(2) Date: Dec. 15, 2022

(87) PCT Pub. No.: WO2021/257069
PCT Pub. Date: Dec. 23, 2021

(65) Prior Publication Data
US 2023/0241609 A1    Aug. 3, 2023

(51) Int. Cl.
*B01L 3/00* (2006.01)
*G01N 15/10* (2024.01)
*G01N 15/1031* (2024.01)

(52) U.S. Cl.
CPC .... *B01L 3/502746* (2013.01); *G01N 15/1023* (2024.01); *G01N 15/1031* (2013.01);
(Continued)

(58) Field of Classification Search
CPC ................... G01N 1/28; G01N 27/026; G01N 2011/0066; G01N 27/221;
(Continued)

(56) References Cited

U.S. PATENT DOCUMENTS

2012/0122084 A1* 5/2012 Wagner ............. B01L 3/502761
435/6.1
2014/0246098 A1* 9/2014 Fraden ............... G01N 15/1484
137/13
(Continued)

FOREIGN PATENT DOCUMENTS

EP         3302801 A1    4/2018
WO    2016/193758 A1   12/2016
(Continued)

OTHER PUBLICATIONS

Schoendube. J., et al., "Single-cell printing based on impedance detection", Biomicrofluidics, vol. 9, Feb. 11, 2015, pp. 014117-1-014117-9.

*Primary Examiner* — Nasima Monsur
(74) *Attorney, Agent, or Firm* — Foley & Lardner LLP

(57) ABSTRACT

A method of detecting passage of a particle into a target location includes receiving a sample on a die including a microfluidic chamber, the microfluidic chamber including a microfluidic path coupling a reservoir to a foyer, and moving the sample from the reservoir to the foyer by firing a nozzle fluidically coupled to the foyer. The method further includes detecting passage of a particle of the sample from the reservoir to the foyer via a first sensor disposed within the microfluidic path, and detecting passage of the particle into the target location via a second sensor disposed between the first sensor and the nozzle. The method includes recording in a dispense map, an indication of whether the target location
(Continued)

includes a single particle or multiple particles based on signals measured by the first sensor and the second sensor.

20 Claims, 6 Drawing Sheets

(52) U.S. Cl.
CPC ... *B01L 2200/027* (2013.01); *B01L 2200/061* (2013.01); *B01L 2200/0647* (2013.01); *B01L 2300/0663* (2013.01); *B01L 2300/0867* (2013.01); *B01L 2400/08* (2013.01)

(58) Field of Classification Search
CPC ..... G01N 2011/0073; G01N 2011/008; G01N 2011/0086; G01N 2011/0093; G01R 27/26; G01R 27/2617; G01R 31/12
See application file for complete search history.

(56) References Cited

U.S. PATENT DOCUMENTS

| | | | |
|---|---|---|---|
| 2016/0107445 A1* | 4/2016 | Giusti | B41J 2/14064 |
| | | | 347/56 |
| 2016/0245813 A1* | 8/2016 | Mir | G01N 33/57492 |
| 2018/0003611 A1* | 1/2018 | Sells | G01N 15/1023 |
| 2018/0015460 A1* | 1/2018 | Sells | B01L 3/50273 |
| 2018/0133715 A1* | 5/2018 | Craig | B01L 3/502784 |
| 2018/0280973 A1 | 10/2018 | Haeberle et al. | |
| 2019/0039063 A1 | 2/2019 | Domingue et al. | |
| 2019/0151848 A1* | 5/2019 | Nielsen | B01L 3/0268 |
| 2019/0227021 A1 | 7/2019 | Han et al. | |

FOREIGN PATENT DOCUMENTS

| | | |
|---|---|---|
| WO | 2020/032956 A1 | 2/2020 |
| WO | 2020/032957 A1 | 2/2020 |

* cited by examiner

DETECTING PASSAGE OF A PARTICLE INTO A TARGET LOCATION

CROSS-REFERENCE TO RELATED APPLICATIONS

This application is a National Stage Application of PCT/US2020/038156, filed Jun. 17, 2020, titled "DETECTING PASSAGE OF A PARTICAL INTO A TARGET LOCATION," which is hereby incorporated by reference in its entirety.

BACKGROUND

Microfluidic systems enable fluid-based experiments to be conducted using much smaller quantities of fluid as compared to microtiter plate-based experiments. These small volumes enable advantages such as a reduction in expensive chemicals used, a reduction in the amount of patient sample used which makes sample collection easier and less intrusive, a reduction in the amount of waste generated, and in some cases a reduction in the time for processing.

BRIEF DESCRIPTION OF FIGURES

Various examples may be more completely understood in consideration of the following detailed description in connection with the accompanying drawings, in which.

Figure 1:
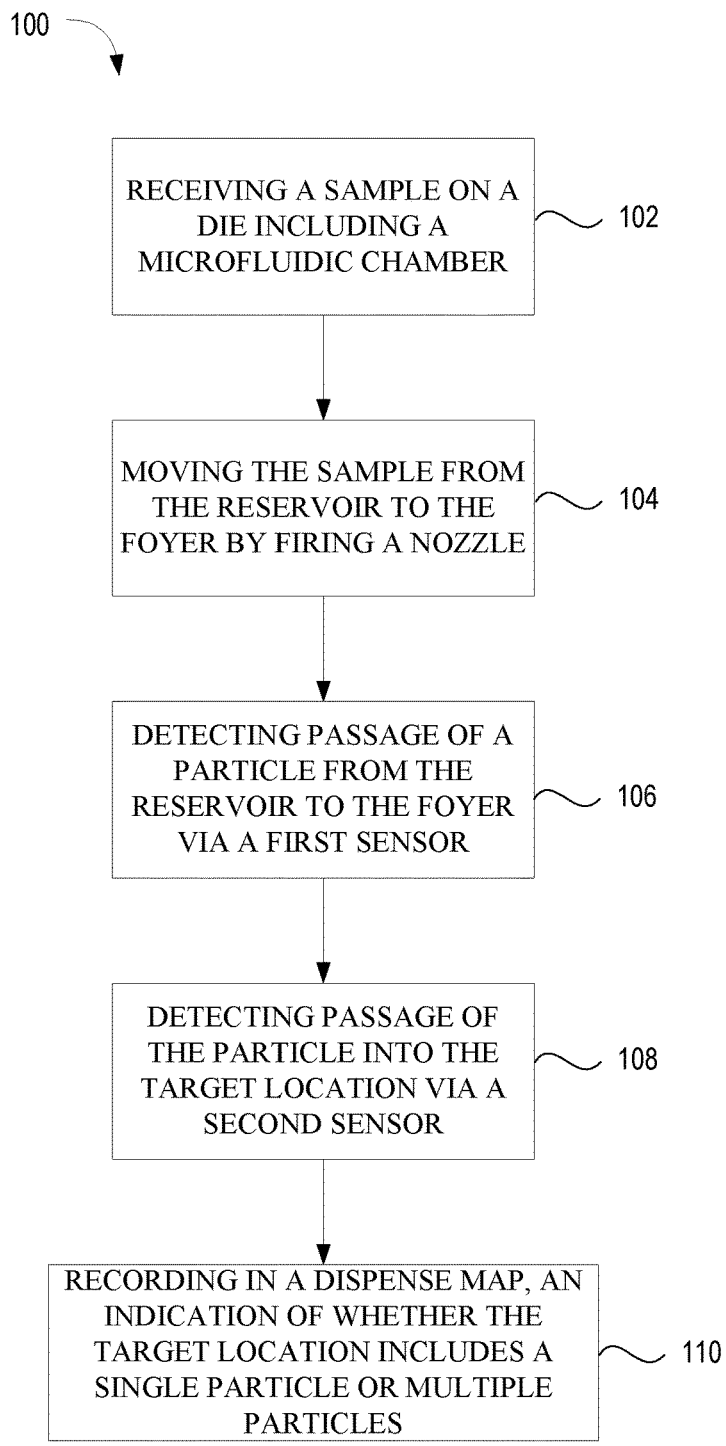
FIG. 1 is a method of detecting passage of a particle into a target location, consistent with the present disclosure.

While various examples discussed herein are amenable to modifications and alternative forms, aspects thereof have been shown by way of example in the drawings and will be described in detail. It should be understood, however, that the intention is not to limit the disclosure to the particular examples described. On the contrary, the intention is to cover all modifications, equivalents, and alternatives falling within the scope of the disclosure including aspects defined in the claims. In addition, the term "example" as used throughout this application is by way of illustration, and not limitation.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

The life sciences research and diagnostics industries are under pressure to reduce costs, increase throughput, and improve the utilization of patient samples. As a result, the instruments and tools used therein are moving from complex macrofluidic-based systems to simpler microfluidic-based technology, moving from pipetting-based technology to dispensing-based technology, and moving from performing a single test per sample to performing multiplexed tests per sample.

Inkjet-based systems can start with microliters of fluid and then dispense picoliters or nanoliters of fluid into specific locations on a substrate. These dispense locations can be either specific target locations on the substrate surface or can be cavities, microwells, channels, or indentations into the substrate. As used herein, a microwell refers to or includes a column capable of storing a volume of fluid between a nanoliter and several milliliters of fluid. There may be tens, hundreds, or even thousands of dispense locations on the substrate, which may represent many tests on a small number of samples, a small number of tests on many samples, or a combination of the two. Additionally, multiple dispensing nozzles or print heads may dispense fluid on the substrate at a time to enable a high-throughput design.

In various life-science applications, it may be beneficial to isolate a particle, such as a cell (among other non-limiting examples), from a remainder of a sample. As a specific example, it may be beneficial to isolate a single cell. In some examples, the particle includes a single cell. Such samples may contain any viral or cellular material, including all prokaryotic or eukaryotic cells, viruses, bacteriophages, mycoplasmas, protoplasts, and organelles. Example samples may thus comprise all types of mammalian and non-mammalian animal cells, plant cells, algae including blue-green algae, fungi, bacteria, protozoa, etc. Representative samples include whole blood and blood-derived products such as plasma, serum and buffy coat, urine, feces, cerebrospinal fluid or any other body fluids, tissues, cell cultures, cell suspensions, etc. The particles within the sample may include cells, nucleic acids, amino acids, antibodies, chemical compounds, and beads (which may have a cell or antibody attached thereto), among other types of particles and combinations thereof. As an illustration, individual cells may be beneficial for cell line and monoclonal antibody development, as well as for chimeric antigen receptor T (CAR-T) treatments, among other examples. In such instances, cells may be chosen to have desired traits, and by isolating single cells, producers can ensure the highest purity and potency of the final product.

Detecting a cell in a microfluidic device has a number of challenges. For instance, the firing of drops from an inkjet nozzle may create fluid flow through a microfluidic path. Cells are carried along from this fluid flow, but the number of fired drops to move a cell through the microfluidic path to the nozzle can vary depending on the path the cell takes. For example, cells that follow a path close to the center of the microfluidic path will take fewer drops to exit the nozzle than cells that follow a path near the walls.

Moreover, to enable a high throughput system, operating a microfluidic device at a high frequency may be desirable. However, the faster the fluid flows through the microfluidic path, the higher the likelihood of obtaining weak sensor signals and incorrectly dispensing cells. Yet further, a system with a single sensor may assume a specific number of drops to flush cell out of a nozzle. Making this assumed number of drops larger increases the likelihood of accidently dispensing multiple cells in a target location. Making this assumed number of drops smaller increases the likelihood of accidently dispensing zero cells in the first target location and then accidently dispensing two cells in the subsequent target location.

It may be desirable for a microfluidic device dispensing specific quantities of cells into each location would have 100% occupancy, where every well in which a cell is desired has a cell, and every well has the correct number of cells. However, errors in cell dispensing can come from a variety of factors, such as clumping cells, variation in cell sizes, and variation in how cells travel through the microfluidic path. A system with a single sensor in the microfluidic path is especially vulnerable to some of these sources of variation.

Detecting passage of a particle into a target location, consistent with the present disclosure, describes a system that includes multiple sensors in each microfluidic path within a cell-dispensing printhead. Detecting passage of a particle into a target location, consistent with the present disclosure, reduces the number of dispensing errors and dispense reporting errors and enables a wider variety of cells to be dispensed from a same device with a reduction of errors. Detecting passage of a particle into a target location, consistent with the present disclosure, allows for an alternative mode of operation during dispensing, allowing the system to achieve high throughput yet briefly operate at a low speed during transit to improve signal quality and to thus reduce the overall number of system errors.

In accordance with the present disclosure, a method of detecting passage of a particle into a target location includes receiving a sample on a die including a microfluidic chamber, the microfluidic chamber including a microfluidic path coupling a reservoir to a foyer, and moving the sample from the reservoir to the foyer by firing a nozzle fluidically coupled to the foyer. As used herein, a sample refers to or includes a volume of liquid containing any viral or cellular material, including all prokaryotic or eukaryotic cells, viruses, bacteriophages, mycoplasmas, protoplasts, and organelles. Non-limiting examples of a sample includes whole blood and blood-derived products such as plasma, serum and buffy coat, urine, feces, cerebrospinal fluid or any other bodily fluids, tissues, cell cultures, cell suspensions, etc. Non-limiting examples of particles contained in a sample include viral or cellular material, including all prokaryotic or eukaryotic cells, viruses, bacteriophages, mycoplasmas, protoplasts, and organelles, all types of mammalian and non-mammalian animal cells, plant cells, algae including blue-green algae, fungi, bacteria, and protozoa. The method further includes detecting passage of a particle from the reservoir to the foyer via a first sensor disposed within the microfluidic path, and detecting passage of the particle into the target location via a second sensor disposed between the first sensor and the nozzle. Different cell sizes and shapes can result in different quality signals at each sensor, and therefore detection of a cell may be complicated by the relative size of the cell (e.g., particle) as compared to the volume of the sample. Example cell volumes for different types of cells are as follows: sperm cell 30 $\mu m^3$; red blood cell 100 $\mu m^3$; lymphocyte 130 $\mu m^3$; neutrophil 300 $\mu m^3$; beta cell 1,000 $\mu m^3$; enterocyte 1,400 $\mu m^3$; fibroblast 2,000 $\mu m^3$; HeLa, cervix 3,000 $\mu m^3$; hair cell (ear) 4,000 $\mu m^3$; osteoblast 4,000 $\mu m^3$; alveolar macrophage 5,000 $\mu m^3$; cardiomyocyte 15,000 $\mu m^3$; megakaryocyte 30,000 $\mu m^3$; fat cell 600,000 $\mu m^3$. As an illustration, detecting a sperm cell as opposed to a fat cell may be complicated with a single sensor in a microfluidic device, given the small volume of the sperm cell relative to other types of cells in a sample. Failure to properly identify a single particle (e.g., cell) versus multiple particles (e.g., cells) may result in, among other things, compromised cell lines, and reduced confidence in test results. The method described herein, however, includes recording in a dispense map, an indication of whether the target location includes a single particle or multiple particles based on signals measured by the first sensor and the second sensor. In some specific examples, the target location includes a single particle such as a single cell. In additional specific examples, the target location includes a single bead. However, examples are not so limited. Such a dispense map provides an indication as to which target locations (e.g., wells) may be relied upon to have the intended number of particles (e.g., cells) for research and development, and may therefore result in, among other things, an increased confidence in cell lines and/or test results.

In some examples, an apparatus for detecting passage of a particle into a target location includes a fluidic input to receive a sample, a die including a microfluidic chamber and circuitry. In such examples, the microfluidic chamber includes a reservoir in fluidic contact with the fluidic input, a microfluidic path coupling the reservoir to a foyer, the foyer to contain a portion of the sample, and a first sensor disposed within the microfluidic path to detect passage of a particle of the sample. The microfluidic chamber further includes a nozzle to eject a volume of the portion of the sample into a target location, and a second sensor to detect passage of a particle of the sample past the foyer. The circuitry controls firing of the nozzle based on signals received from the sensors, and records in a dispense map, an indication of whether the target location includes a single particle or multiple particle based on signals measured by the first sensor and the second sensor.

In some examples, a non-transitory computer-readable medium may store instructions which, when executed by a processor, may cause the processor to detect passage of a particle into a target location. For instance, the non-transitory computer-readable medium may store instructions that cause the processor to detect passage of a particle of a sample along a microfluidic path, via a first sensor disposed within the microfluidic path, wherein the microfluidic path couples a reservoir storing the sample and a foyer. The non-transitory computer-readable medium may store instructions to eject a volume of the sample into a target location via the nozzle, and stop firing the nozzle responsive to detecting passage of the particle via a second sensor disposed between the first sensor and the nozzle. The non-transitory computer-readable medium may store instructions to record in a dispense map, an indication of whether the target location includes a single particle or multiple particle based on signals measured by the first sensor and the second sensor.

Turning now to the figures, FIG. 1 is a flowchart of a method 100 of detecting passage of a particle into a target location, consistent with the present disclosure. At 102, the method 100 includes receiving a sample on a die including a microfluidic chamber. As described herein, the microfluidic chamber includes a microfluidic path coupling a reservoir to a foyer. At 104, the method 100 includes moving the sample from the reservoir to the foyer by firing a nozzle fluidically coupled to the foyer. At 106, the method 100 includes detecting passage of a particle from the reservoir to the foyer via a first sensor disposed within the microfluidic path. As used herein, a particle refers to or includes a cell, a bead, an antibody, or combinations thereof. At 108, the method 100 includes detecting passage of the particle into the target location via a second sensor disposed between the first sensor and the nozzle. More than two sensors may be used to detect the passage of a particle into the target location. For instance, in some examples, the method includes detecting movement of the particle within the foyer via a plurality of additional sensors disposed between the first sensor and the second sensor.

At 110, the method 100 includes recording in a dispense map, an indication of whether the target location includes a single particle or multiple particles based on signals measured by the first sensor and the second sensor. The first sensor signal, which detects passage of a particle into the foyer provides an indication to circuitry that the particle may pass the second sensor soon. Once the particle is detected by the second sensor and a signal is provided to the circuitry indicating passage of the particle or particles, the dispense map may record an indication of a single particle or multiple particles in the dispense map. For instance, circuitry may use peak parameters including peak height, peak width, time from last signal, and slope change to identify single cells versus clusters of cells or debris. Based on this information, a map of wells (e.g., target locations) can be generated, indicating which location includes a single particle, multiple particles, or no particles.

In some examples, the method 100 includes adjusting a firing rate of the nozzle to dispense the particle into a target location, in response to detecting passage of the particle. For example, the method may include reducing the firing rate of the nozzle responsive to detecting, via the plurality of additional sensors, passage of the particle through the foyer. For example, a nozzle or nozzles may slow down the dispensing rate from 1 kilo hertz (kHz) to 0.5 kHz to slow the flow rate of fluid through the foyer and decrease the speed at which the particle transits to the nozzle.

In some examples, the method 100 includes terminating dispensing the sample in the target location in response to detecting passage of the particle into the target location via the second sensor. For instance, after a particle is dispensed into a target location, the dispensing apparatus may move to the next target location and dispense fluid in the next target location.

In some examples, the method 100 includes entering an alternate action in response to detecting a second particle signal at the first sensor before the second sensor has detected the signal of the particle. In such examples, the method 100 may include choosing an alternative action, such as stopping dispensing, moving to a spittoon location and clearing the foyer of the multiple particles before returning to the original location and resuming dispense operations. This decreases the probability of dispensing multiple particles into a location when a single particle is intended.

Figure 2:
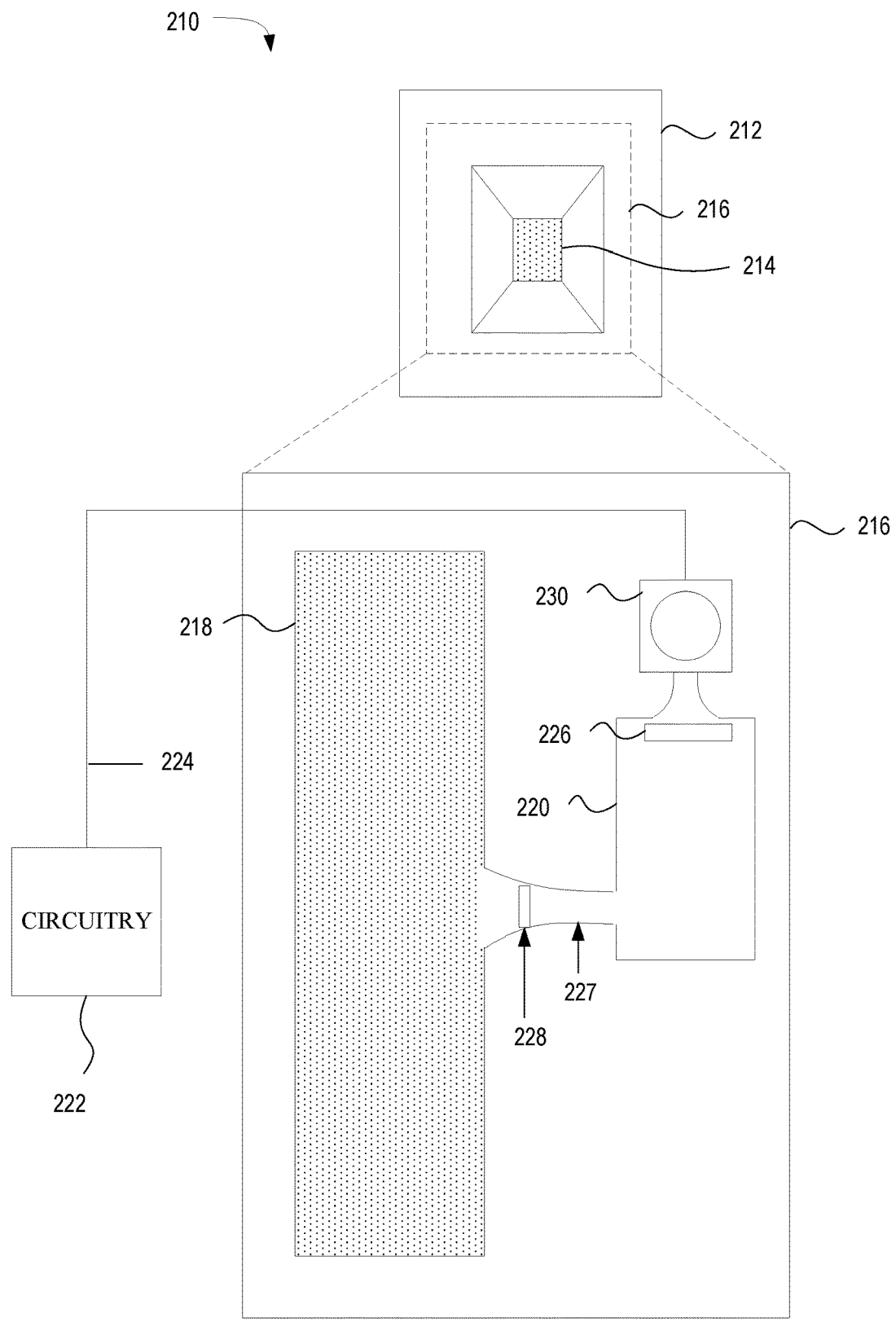
FIG. 2 is a diagram illustrating an example apparatus for detecting passage of a particle into a target location, consistent with the present disclosure.

FIG. 2 is a diagram illustrating an example apparatus 210 for detecting passage of a particle into a target location, consistent with the present disclosure. The apparatus 210 may include a fluidic input 212 to receive a sample and a die including a microfluidic chamber 216. The microfluidic chamber 216 may be disposed beneath the fluidic input 212, such that fluid that flows through the fluidic input 212 is deposited onto the microfluidic chamber 216. Accordingly, the fluidic input 212 may include an aperture 214 to receive the sample. The location and general size of the microfluidic chamber 216 relative to the fluidic input 212 is illustrated in dashed lines, and an exploded view of microfluidic chamber 216 illustrates the various components of the microfluidic chamber 216. As an illustration, as the sample is received in fluidic input 212, the sample flows into aperture 214. The sample flows through the aperture 214 and onto the bottom side of apparatus 210, where the microfluidic chamber 216 is disposed.

The microfluidic chamber 216 may include a reservoir 218 in fluidic contact with the fluidic input 212. The microfluidic chamber 216 may further include a microfluidic path 227 coupling the reservoir 218 to a foyer 220, the foyer 220 to contain a portion of the sample. As illustrated, a first sensor 228 may be disposed within the microfluidic path 227 to detect passage of a particle of the sample. A nozzle 230 may eject a volume of the portion of the sample into a target location (not illustrated in FIG. 2). A second sensor 226 may detect passage of a particle of the sample past the foyer 220. Circuitry 222 may control firing of the nozzle 230 based on signals received from the sensors (e.g., 228 and 226), and record in a dispense map, an indication of whether the target location includes a single particle or multiple particles based on signals measured by the first sensor 228 and the second sensor 226.

As an illustration, the sample may flow from the aperture 214 to a reservoir 218 of the microfluidic chamber 216. As the sample, including particles, flows from the reservoir 218 to the foyer 220, a first sensor 228 may detect passage of a particle of the sample into the foyer 220.

The microfluidic chamber 216 may include a nozzle 230 to eject a volume of the portion of the sample into a target location. As used herein, the target location refers to or includes a particular location to which a particle is to be dispensed. The target location may be a particular well on a microwell plate, a substrate, and/or other locations to which a sample may be dispensed.

The first sensor 228 may be disposed within the microfluidic path 227, and the second sensor 226 may be disposed within a threshold distance of the nozzle 230 to detect passage of a particle of the sample into the nozzle 230. As used herein, the threshold distance may be a distance close enough to the nozzle such that passage of a particle into the nozzle may be detected. An example range of the threshold distance of the first sensor, as measured from an edge of the target nozzle, may be 5-100 um, although examples are not so limited.

Sensor 228 and sensor 226 may be the same type of sensor, or different types of sensors. For instance, the first sensor 228 may be an impedance-based sensor or a capacitance-based sensor. The sensor (e.g., 228 and/or 226) may be an impedance-based sensor, a capacitance-based sensor or another type of sensor, such as an optical sensor, a thermal sensor, a voltammetric sensor, an amperometric/coulometric sensor, a transistor, such as a field-effect transistor, a magnetic sensor, among others. An impedance-based sensor or a capacitance-based sensor may include a pair of electrodes that measure the impedance or capacitance of the fluid containing the sample, with the capacitance and/or impedance being measured between the electrodes. In various examples, the first sensor 228 is an impedance-based sensor or a capacitance-based sensor and the particle includes a single cell. For example, the impedance or capacitance may be measured for a current or voltage path between the two electrodes. More specifically, a high-frequency alternating (e.g., sine-wave) current or voltage may be applied to one electrode and the interaction of the alternating electrical field with the fluid is monitored at the other electrode, which may be in the form of an alternating current signal. The two electrodes may be separated from the fluid by a dielectric layer. Changes in impedance and/or capacitance between the electrodes may indicate the presence of a particle, such as a single cell. The impedance measurements may be processed by the circuitry 222 to determine the presence of a particle. Impedance-based and capacitive-based sensors may not contact the particles, which may increase cell viability, and may be used to sense particles without the use of a label and/or imaging. Additionally, impedance-based sensors and capacitive-based sensors may be inexpensive, small in size, and may provide sensor signals at high speeds, as compared to other types of sensors. The second sensor 226 may be an impedance-based sensor or a capacitance-based sensor, among other examples. Examples of the present disclosure are not limited to impedance-based sensors or capacitance-based sensors, and additional and/or different types of sensors may be used.

The nozzle 230 may include a fluid ejector, such as a thermal inkjet resistor, to eject the sample onto the target location. As such, the microfluidic chamber 216 may include circuitry 222 to control firing of the nozzle 230. In various examples, the firing circuitry 222 may change a rate of firing of the nozzle 230 responsive to the first sensor 228 detecting passage of a particle. For instance, responsive to detecting a particle passing sensor 228, the firing circuitry 222 may decrease a rate of firing of nozzle 230 such that a single particle may be ejected from nozzle 230. Once a particle is detected at sensor 228, the microfluidic chamber may enter a particular mode, e.g., particle watch mode, in which a complementary signal is detected at the second sensor 226. While in particle watch mode, the nozzle 230 may fire at a slower rate.

The particle (e.g. cell) is expected to take a certain amount of time between the first sensor 228 and the second sensor 226, $t_0 \pm \delta t$ depending on the size of the particle. If the particle is a clump, it may traverse the path longer, and will not fit within the bounds $t_0 \pm \delta t$ and therefore will not be classified as a particle of interest. The bound may be soft, with particles taking longer time than $t_0$ being assigned a lower probability of being a desired particle.

While FIG. 2 illustrates the second sensor 226 disposed at an end of the foyer 220 near the nozzle 230, examples are not so limited. For instance, in various examples the second sensor 226 may be disposed within the nozzle 230. Including the second sensor in the nozzle 230 has the advantage of measuring the particle signal immediately before the particle exits the microfluidic path (i.e. is ejected out nozzle). Similarly, additional sensors may be disposed within foyer 220, as discussed with regards to FIG. 3.

Figure 3:
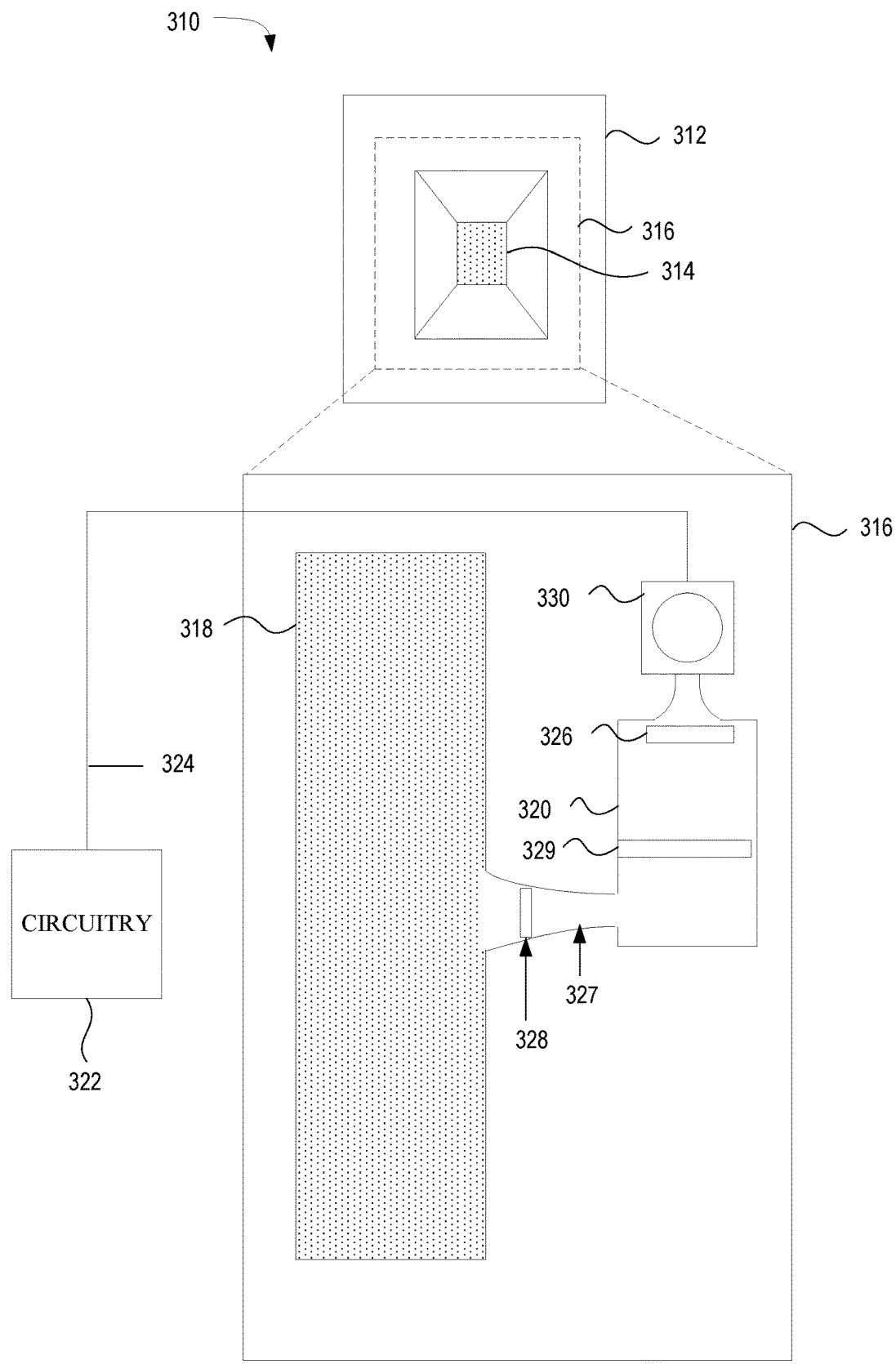
FIG. 3 illustrates an example apparatus including multiple sensors, consistent with the present disclosure.

FIG. 3 illustrates an example apparatus 310 including multiple sensors, consistent with the present disclosure. Similar to apparatus 210 illustrated in FIG. 2, the apparatus 310 includes a fluid input 312, an aperture 314, and a reservoir 318 which receives a sample on the microfluidic chamber 316. A microfluidic path 327 couples the reservoir 318 and the foyer 320, and a first sensor 328 is disposed within the microfluidic path 327. As illustrated in FIG. 3, the microfluidic chamber 316 may further include a third sensor 329 disposed within the foyer 320 to detect passage of a particle between the first sensor 328 and the second sensor 326. A second and third (or more) sensor in the fluid path enables progress of the particle through the microfluidics path to be more closely tracked. Signals for the three (or more) sensors can be aggregated to decrease the likelihood of false positives or negatives. In the case when a second particle enters the foyer 320 before the first particle has exited; a third sensor increases the likelihood that these two particles can be distinguished from one another and dispensed in different locations.

Although FIG. 3 illustrates sensor 329 generally at a mid-point of the foyer 320, examples are not so limited, and the sensor 329 may be located at any point within foyer 320 between sensor 328 and sensor 326. Also, as discussed with regards to FIG. 4, the microfluidic chamber may include more than three sensors. As an example, the microfluidic chamber 316 may include a plurality of sensors disposed within the foyer 320 between the first sensor 328 and the second sensor 326 to detect passage of a particle between the first sensor 328 and the second sensor 326. Regardless of the number of sensors, the circuitry 322 may control a firing rate of the nozzle 330, by sending a signal to nozzle 330 via electrical connects 324.

Figure 4:
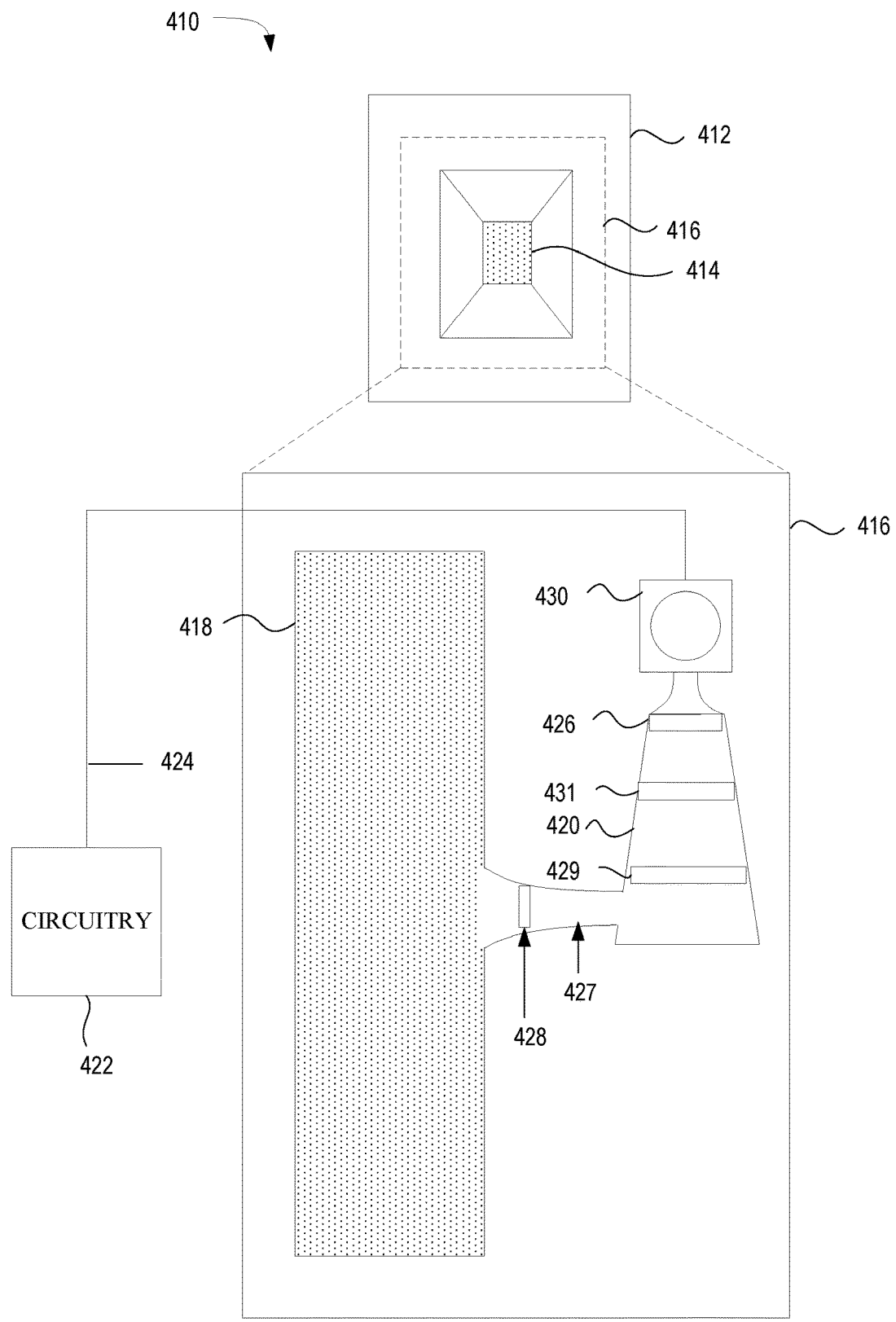
FIG. 4 illustrates an example apparatus including a tapered foyer, consistent with the present disclosure.

FIG. 4 illustrates an example apparatus 410 including a tapered foyer, consistent with the present disclosure. Similar to apparatus 310 illustrated in FIG. 3, the apparatus 410 includes a fluid input 412, an aperture 414, and a reservoir 418 which receives a sample on the microfluidic chamber 416. A microfluidic path 427 couples the reservoir 418 and the foyer 420, and a first sensor 428 is disposed within the microfluidic path 427. As illustrated in FIG. 4, the microfluidic chamber 416 may further include a third sensor 429 and a fourth sensor 431 disposed within the foyer 420 to detect passage of a particle between the first sensor 428 and the second sensor 426.

As illustrated in FIG. 4, a range of obstacles may be placed between sensors to delay the particle from reaching the next sensors based on its size. For example in a cone shaped foyer 420, a small particle will not be slowed down by the constriction but a larger object or cluster of particles will be restricted from passing from sensor 429 through foyer 420 to nozzle 430, with increasing delays between sensors. This transit time delta can help differentiate clumps from individual particles.

While particle concentration is intended to be low enough that one particle at a time will be in the foyer at a time, there may be instances in which a second particle has entered the foyer before the first particle has left the foyer. In a system with a single sensor, this means that there is a high probability of a double dispense, with more particles being dispensed than intended. By including a plurality of sensors as described herein, with one or more sensors within the foyer region, the progress of the particle through the foyer can be tracked and can provide an improved probability that a single particle is dispensed into a location even when multiple particles reside in the foyer at once. As an example, particles may pass a first sensor, such as sensor 428 illustrated in FIG. 4, and subsequently flow backwards toward sensor 428 rather than toward nozzle 430 due to back pressure from firing of nozzle 430. Without additional sensors disposed between sensor 428 and nozzle 430, dispensing errors may occur because the backflow prevents the particle from being dispensed in the target location and will, instead, be dispensed in the next target location. The end result of such backflow scenarios, when a single sensor is used, is that one well may have no particles in it while the next well may have two particles in it when both wells are intended to have a single particle.

Another example of possible errors that may occur with a single sensor, is dependent on the size/volume of the particle and the path that the particle takes within the foyer. For example, a cell with a smaller volume, such as a red blood cell, may travel down a center of the foyer 420 or down an edge of foyer 420. If the red blood cell travels down the edge of the foyer 420, it may take longer (e.g., more firing of the nozzle 430) for the red blood cell to reach the nozzle 430 and dispense into the target location. Similarly, if the red blood cell travels down the center of the foyer 420, the red blood cell may reach the nozzle 430 faster (e.g., with less firing of the nozzle 430). Without additional sensors disposed between sensor 428 and nozzle 430, the nozzle 430 may fire a specified number of times after the cell (e.g., particle) is detected at the first sensor 428 with the assumption that the particle has exited the nozzle 430 and into the target location. However, such assumption may be incorrect based on the volume of the particle and the route that the particle has taken within the foyer 420. By adding additional sensors, such as sensor 429, 431, and 426, the movement of the cell within the foyer 420 may be detected and confidence increased that the intended number of cells are dispensed in each target location.

Figure 5:
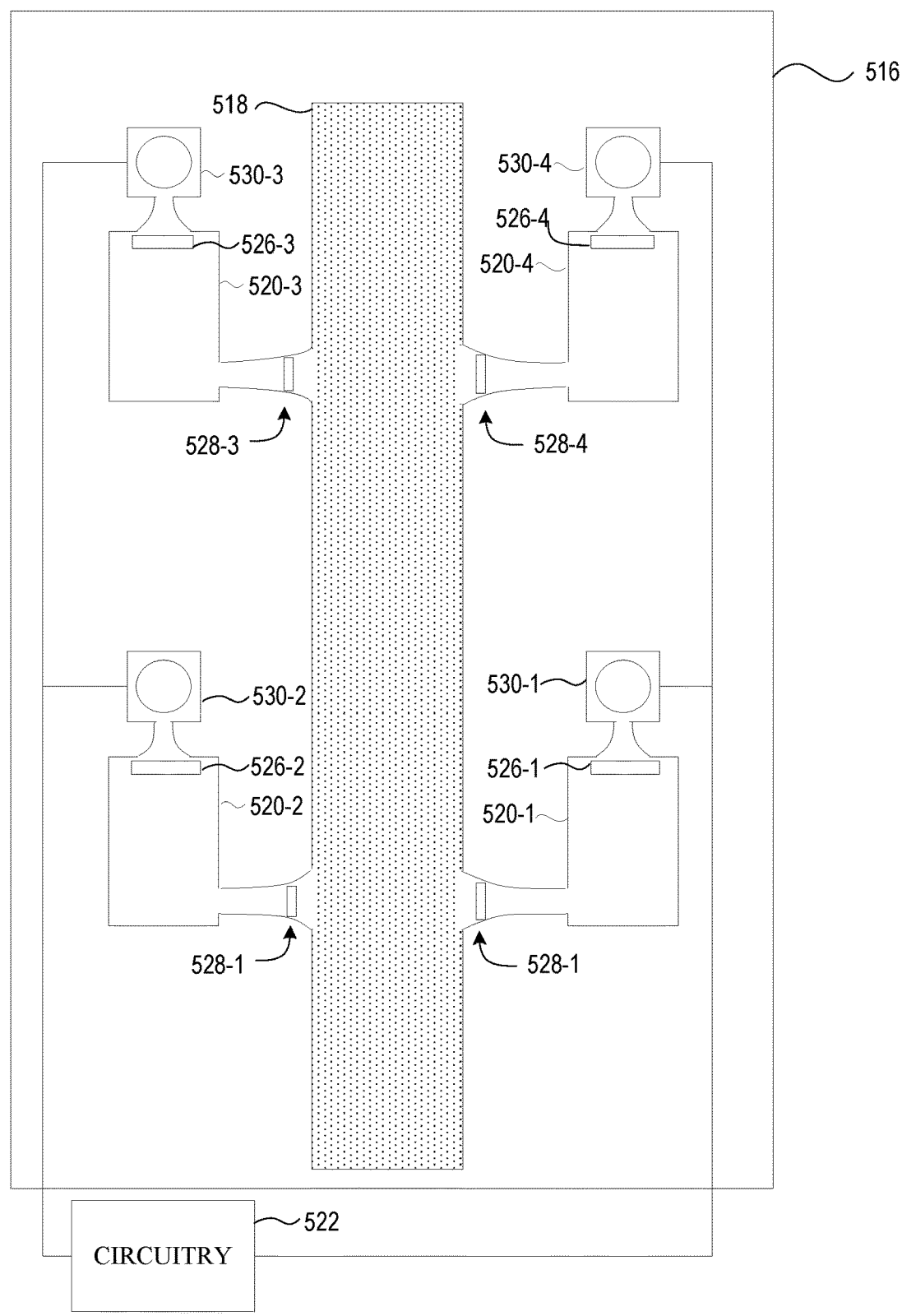
FIG. 5 is a diagram illustrating an example apparatus including multiple foyers for detecting passage of a particle into a target location, consistent with the present disclosure.

FIG. 5 is a diagram illustrating an example apparatus 510 including multiple foyers 520-1, 520-2, 520-3, and 520-4 for detecting passage of a particle into a target location, consistent with the present disclosure. In the example illustrated in FIG. 5, each foyer 520-1, 520-2, 520-3, and 520-4 is coupled to a respective nozzle 530-1, 530-2, 530-3, and 530-4. Each nozzle 530-1, 530-2, 530-3, and 530-4 may dispense a particle into a different respective target location. The target locations may be within a high-density micro-titer plate, such as a 1536 well plate, where the spacing between the nozzles 530-1, 530-2, 530-3, and 530-4 match the spacing between different wells without moving the substrate. These paths may be similar and redundant, with the redundancy used either to increase throughput or to increase system robustness. These paths can be operated separately, concurrently, or in a round-robin fashion (cycling between which path is the active path). As discussed with regards to FIG. 1, the apparatus may include a die including a microfluidic chamber 516, and circuitry 522 to control firing of each respective target nozzle. 530-1, 530-2, 530-3, 530-4.

Each foyer 520-1, 520-2, 520-3, and 520-4 is coupled to a different respective microfluidic path. Similarly, each foyer 520-1, 520-2, 520-3, and 520-4 includes a first sensor 528-1, 528-2, 528-3, and 528-4, respectively. The first sensor detects passage of particles from the reservoir 518 into the respective foyer. As discussed herein, a second sensor 526-1, 526-2, 526-3, and 526-4 in each respective foyer detects passage of a particle passing into a respective nozzle, e.g., 530-1, 530-2, 530-3, 530-4. The circuitry 522 may control firing of each respective nozzle based on the signals received from the associated sensors.

As illustrated in FIG. 5, the microfluidic chamber 516 may include a plurality of foyers 520-1, 520-2, 520-3, and 520-4, each coupled to a common reservoir 518. Each respective foyer 520-1, 520-2, 520-3, and 520-4 may be coupled to the reservoir by a different respective microfluidic path. For each respective foyer, passage of particles within the foyer may be monitored using the associated sensors. When the first sensor detects passage of a particle, various actions may be taken.

In cases where the multiple fluidic paths are addressing what is effectively the same target location within a low-density micro-titer plate, such as a 384, 96, 48, 24 or lower-density well plate, the microfluidic paths can be operated concurrently or in a round-robin method to increase throughput or to enable slower operation of each microfluidic path as a way to decrease errors. In the round-robin operation, the circuitry cycles between operating the various paths. For instance, nozzle 530-1 may fire to draw a particle through foyer 520-1 and out of nozzle 530-1, then nozzle 530-2 may fire to draw a particle through foyer 520-2 and out of nozzle 530-2, then nozzle 530-3 may fire to draw a particle through foyer 530-3 and out of nozzle 530-3, and nozzle 530-4 may fire to draw a particle through foyer 530-4 and out of nozzle 530-4. Additionally and/or alternatively, various nozzles may be fired concurrently. As an illustration, nozzles 530-1 and 530-2 may fire at a same time, and nozzles 530-3 and 530-4 may fire at a same time. Operation of the nozzles illustrated in FIG. 5 is not limited to those examples described, and the plurality of nozzles 530-1, 530-2, 530-3 and 530-4 may fire in any sequence and/or combination contemplated.

Although the circuitry 322, 422, 522 of the example apparatuses of FIGS. 3-5 are illustrated as being disposed separate from the respective dies, sometimes referred to as "off-die", examples are not so limited. In some examples, the circuitry 322, 422, 522 may be disposed on the dies, which may be referred to as "on-die".

Figure 6:
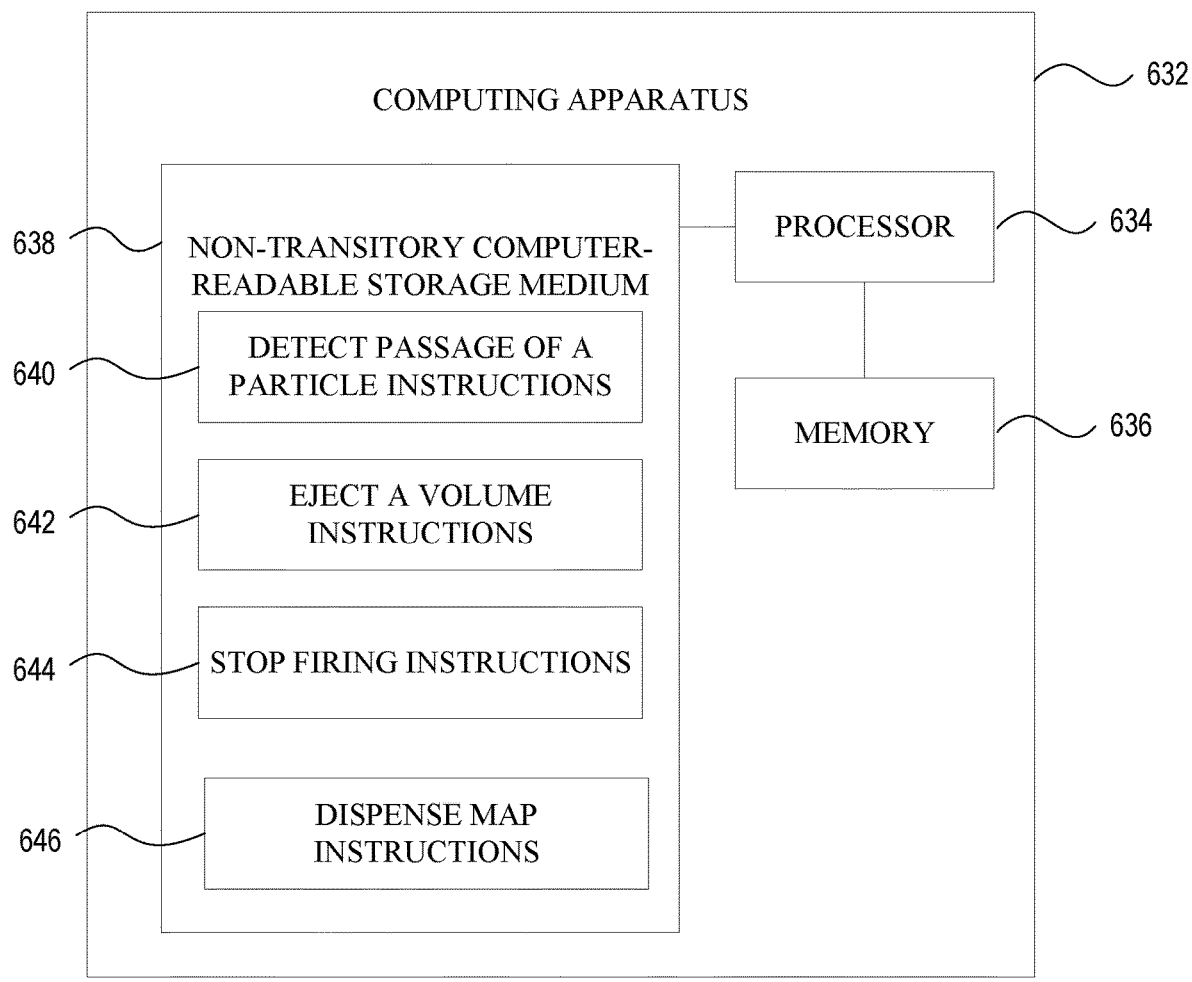
FIG. 6 is a diagram illustrating an example computing apparatus for detecting passage of a particle into a target location, consistent with the present disclosure.

FIG. 6 is a diagram illustrating an example computing apparatus 632 for detecting passage of a particle into a target location, consistent with the present disclosure. In the example of FIG. 6, the computing apparatus 632 may include a processor 634 and a non-transitory computer-readable storage medium 638, and a memory 636. The non-transitory computer-readable storage medium 638 further includes instructions 640, 642, 644, and 646 for detecting passage of a particle into a target location. The computing apparatus 632 may be, for example, a dispensing instrument or a digital dispenser, a printer, a mobile device, multimedia device, a secure microprocessor, a notebook computer, a desktop computer, an all-in-one system, a server, a network device, a controller, a wireless device, or any other type of device capable of executing the instructions 640, 642, 644, and 646. In certain examples, the computing apparatus 632 may include or be connected to additional components such as memory, controllers, etc.

The processor 634 may be a central processing unit (CPU), a semiconductor-based microprocessor, a graphics processing unit (GPU), a microcontroller, special purpose logic hardware controlled by microcode or other hardware devices suitable for retrieval and execution of instructions stored in the non-transitory computer-readable storage medium 638, or combinations thereof. The processor 634 may fetch, decode, and execute instructions 640, 642, 644, and 646 to detecting passage of a particle into a target location, as discussed with regards to FIG. 1, FIG. 2, FIG. 3, FIG. 4, and FIG. 5. As an alternative or in addition to retrieving and executing instructions, the processor 634 may include at least one integrated circuit (IC), other control logic, other electronic circuits, or combinations thereof that include a number of electronic components for performing the functionality of instructions 640, 642, 644, and 646.

Non-transitory computer-readable storage medium 638 may be an electronic, magnetic, optical, or other physical storage device that contains or stores executable instructions. Thus, non-transitory computer-readable storage medium 638 may be, for example, Random Access Memory (RAM), an Electrically Erasable Programmable Read-Only Memory (EEPROM), a storage device, an optical disc, etc. In some examples, the computer-readable storage medium 638 may be a non-transitory storage medium, where the term 'non-transitory' does not encompass transitory propagating signals. As described in detail below, the non-transitory computer-readable storage medium 638 may be encoded with a series of executable instructions 640, 642, 644, and 646. In some examples, non-transitory computer-readable storage medium 638 may implement a memory 636 to store and/or execute instructions 640, 642, 644, and 646. Memory 636 may be any non-volatile memory, such as EEPROM, flash memory, etc.

In various examples, the non-transitory computer-readable storage medium 638 may store instructions 640, 642, 644, and 646 which, when executed by a processor 634, may cause the processor 634 to control a microfluidic chamber for detecting passage of a particle into a target location. For instance, the non-transitory computer-readable medium 638 may store detect passage of a particle instructions 640 that cause the processor 634 to detect passage of a particle of a sample along a microfluidic path, via a first sensor disposed within the microfluidic path, wherein the microfluidic path couples a reservoir storing the sample and a foyer.

Additionally, the medium 638 may store eject a volume instructions 642 that cause the processor 634 to eject a volume of the sample into a target location via the nozzle. Yet further, the medium 638 may include stop firing instructions 644 that cause the processor 634 to stop firing the nozzle responsive to detecting passage of the particle via a second sensor disposed between the first sensor and the nozzle.

In some examples, the medium 638 may include dispense map instructions 646 that cause the processor 634 to record in a dispense map, an indication of whether the target location includes a single particle or multiple particles based on signals measured by the first sensor and the second sensor. In such examples, every particle generates a signal as it passes over the sensor and the presence of the particle may be detected. Each detected particle may be jetted into a separate well, and a map may be generated indicating which wells have a single particle, such as a single cell or a single bead.

In various examples, the medium 638 stores instructions that, when executed, cause the processor 634 to detect movement of the particle within the foyer via a third sensor and a fourth sensor disposed within the foyer between the first sensor and the second sensor. As an example, a nozzle may be fired at a first rate. Responsive to detecting passage of the particle past the third sensor, instructions executed by the processor may reduce the rate of firing of the nozzle to a second rate that is lower than the first rate of firing. Responsive to detecting passage of the particle past the fourth sensor, instructions executed by the processor may reduce the rate of firing of the nozzle to a third rate that is lower than the second rate of firing.

Terms to exemplify orientation, such as left/right, and top/bottom, may be used herein to refer to relative positions of elements as shown in the figures. It should be understood that the terminology is used for notational convenience and that in actual use the disclosed structures may be oriented different from the orientation shown in the figures. Thus, the terms should not be construed in a limiting manner.

Various terminology as used in the Specification, including the claims, connote a plain meaning in the art unless otherwise indicated. As examples, the Specification describes and/or illustrates aspects useful for implementing the claimed disclosure by way of various structure, such as circuits or circuitry selected or designed to carry out specific acts or functions, as may be recognized in the figures or the related discussion as depicted by or using terms such as blocks, device, and system, and/or other examples. It will also be appreciated that certain of these blocks may also be used in combination to exemplify how operational aspects have been designed and/or arranged. Whether alone or in combination with other such blocks or circuitry including discrete circuit elements such as transistors, resistors, these above-characterized blocks may be circuits coded by fixed design and/or by configurable circuitry and/or circuit elements for carrying out such operational aspects. In certain examples, such a programmable circuit refers to or includes computer circuits, including memory circuitry for storing and accessing a set of program code to be accessed/executed as instructions and/or configuration data to perform the related operation. Depending on the data-processing application, such instructions and/or data may be for implementation in logic circuitry, with the instructions as may be stored in and accessible from a memory circuit. Such instructions may be stored in and accessible from a memory via a fixed circuitry, a limited group of configuration code, or instructions characterized by way of object code.

Where the Specification may make reference to a "first [type of structure]", a "second [type of structure]", etc., the adjectives "first" and "second" are not used to connote any description of the structure or to provide any substantive meaning; rather, such adjectives are merely used for English-language antecedence to differentiate one such similarly-named structure from another similarly-named structure designed or coded to perform or carry out the operation associated with the structure.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A method, comprising:
    receiving a sample on a die including a microfluidic chamber, the microfluidic chamber including a microfluidic path coupling a reservoir to a foyer;
    moving the sample from the reservoir to the foyer by firing a nozzle fluidically coupled to the foyer;
    detecting passage of a first particle of the sample from the reservoir to the foyer via a first sensor disposed within the microfluidic path;
    detecting passage of the first particle into a target location via a second sensor disposed between the first sensor and the nozzle;
    entering an alternate action in response to detecting a second particle signal at the first sensor before the second sensor has detected the signal of the first particle while the first particle is still in the foyer, wherein the alternate action includes first stopping dispensing, then moving to a spittoon location and then clearing the foyer of particles before returning to an original location and resuming dispense operations to decrease a probability of dispensing multiple particles into a location when a single particle is intended; and
    recording in a dispense map, an indication of whether the target location includes a single particle or multiple particles based on signals measured by the first sensor and the second sensor.

2. The method of claim 1, including adjusting a firing rate of the nozzle to dispense the first particle into a target location, in response to detecting passage of the first particle.

3. The method of claim 2, further comprising adjusting the firing rate of the nozzle in response to detecting passage of the first particle into the target location via the first sensor.

4. The method of claim 3, further comprising adjusting the firing rate of the nozzle in response to detecting passage of the first particle into the target location via the second sensor.

5. The method of claim 4, including terminating dispensing the sample in the target location in response to detecting passage of the first particle into the target location via the second sensor.

6. The method of claim 1, including detecting movement of the first particle within the foyer via a plurality of additional sensors disposed between the first sensor and the second sensor.

7. The method of claim 6, including reducing a firing rate of the nozzle responsive to detecting, via the plurality of additional sensors, passage of the first particle through the foyer.

8. The method of claim 1, wherein detecting passage of the first particle from the reservoir to the foyer via the first sensor and detecting passage of the first particle into the target location via the second sensor occurs within a predetermined time period, wherein the predetermined time period is based on an expected transit time for the first particle to travel from the first sensor to the second sensor.

9. An apparatus, comprising:
a fluidic input configured to receive a sample;
a die including a microfluidic chamber, wherein the microfluidic chamber includes:
a reservoir in fluidic contact with the fluidic input;
a microfluidic path coupling the reservoir to a foyer, wherein the foyer is configured to contain a portion of the sample;
a first sensor disposed within the microfluidic path, wherein the first sensor is configured to detect passage of a first particle of the sample;
a nozzle configured to eject a volume of the portion of the sample into a target location; and
a second sensor configured to detect passage of the first particle of the sample past the foyer; and
a circuitry configured to:
control firing of the nozzle based on signals received from the sensors,
enter an alternate action in response to detecting a second particle signal at the first sensor before the second sensor has detected the signal of the first particle while the first particle is still in the foyer, wherein the alternate action includes first stopping dispensing, then moving to a spittoon location and then clearing the foyer of particles before returning to an original location and resuming dispense operations to decrease a probability of dispensing multiple particles into a location when a single particle is intended; and
record in a dispense map, an indication of whether the target location includes a single particle or multiple particles based on signals measured by the first sensor and the second sensor.

10. The apparatus of claim 9, wherein the first sensor is an impedance-based sensor or a capacitance-based sensor and the particle includes a single cell.

11. The apparatus of claim 10, wherein the second sensor is an impedance-based sensor or a capacitance-based sensor.

12. The apparatus of claim 9, wherein the circuitry is further configured to control a rate of firing of the nozzle responsive to the first sensor detecting passage of the first particle.

13. The apparatus of claim 9, wherein the circuitry is further configured to control a rate of firing of the nozzle responsive to the second sensor detecting passage of the first particle.

14. The apparatus of claim 13, wherein the circuitry is further configured to terminate ejecting the portion of the sample responsive to the second sensor detecting passage of the first particle.

15. The apparatus of claim 9, wherein the second sensor is disposed within the nozzle.

16. The apparatus of claim 9, wherein the microfluidic chamber includes a third sensor disposed within the foyer to detect passage of the first particle between the first sensor and the second sensor.

17. The apparatus of claim 9, wherein the microfluidic chamber includes a plurality of sensors disposed within the foyer between the first sensor and the second sensor to detect passage of the first particle between the first sensor and the second sensor.

18. A non-transitory computer-readable medium storing instructions which, when executed by a processor, cause the processor to:
detect passage of a first particle of a sample along a microfluidic path, via a first sensor disposed within the microfluidic path, wherein the microfluidic path couples a reservoir storing the sample and a foyer;
eject a volume of the sample into a target location via a nozzle;
detect a second particle signal at the first sensor before the second sensor has detected the signal of the first particle while the first particle is still in the foyer;
in response to detecting the second particle signal: enter an alternate action to first stop dispensing, then move to a spittoon location, then clear the foyer of particles, then return to an original location, and resume dispense operations to decrease a probability of dispensing multiple particles into a location when a single particle is intended;
stop firing the nozzle responsive to detecting passage of the first particle via a second sensor disposed between the first sensor and the nozzle; and
record in a dispense map, an indication of whether the target location includes a single particle or multiple particles based on signals measured by the first sensor and the second sensor.

19. The non-transitory computer-readable medium of claim 18, further including instructions that, when executed, cause the processor to:
detect movement of the first particle within the foyer via a third sensor and a fourth sensor disposed within the foyer between the first sensor and the second sensor.

20. The non-transitory computer-readable medium of claim 19, further including instructions that, when executed, cause the processor to:
responsive to detecting passage of the first particle past the third sensor, reduce a rate of firing of the nozzle.

* * * * *